US005613131A

United States Patent [19]

Moss et al.

[11] Patent Number: 5,613,131

[45] Date of Patent: Mar. 18, 1997

[54] AUTO-FORMATTING OF TABLES IN A SPREADSHEET PROGRAM

[75] Inventors: Ken A. Moss, Redmond; Andrew Kwatinetz, Seattle, both of Wash.

[73] Assignee: Microsoft Corporation, Redmond, Wash.

[21] Appl. No.: 11,305

[22] Filed: Jan. 29, 1993

[51] Int. Cl.[6] .................................................... G06F 17/00

[52] U.S. Cl. ........................................... 395/765; 395/770

[58] Field of Search .................................... 395/148, 149, 395/61, 155, 600, 12, 3, 161, 1, 10

[56] References Cited

U.S. PATENT DOCUMENTS

| | | | |
|---|---|---|---|
| 5,175,810 | 12/1992 | Young et al. | 395/148 |
| 5,317,686 | 5/1994 | Salas et al. | 395/157 |
| 5,367,619 | 11/1994 | DiPaolo et al. | 395/149 |

OTHER PUBLICATIONS

*Microsoft Excel 3.0 User's Guide;* 1990; pp. 158–159, 90–91, 186–187, 478.

*Quattro Pro for Windows User's Guide,* Borland International, Inc., 1992, pp. 10–11, 34–35, 74–75, 86–90, 392.

Mannino et al, "A form based approach for database analysis and design," *Communications of the ACM,* Feb. 1992, v35 n2, pp. 108–120.

*Primary Examiner*—Joseph H. Feild

*Attorney, Agent, or Firm*—Seed and Berry LLP

[57] ABSTRACT

A number of predefined table formats are provided for formatting a table. A user converts a table into the predefined table format by selecting the range of cells for the table and then selecting the predefined table format to be applied to the range of cells of the table. The formatting is performed automatically by a data processing system. Heuristics are used to determine the structure of the table to be formatted. Separate parts of the table are then successively formatted in accordance with the selected predefined table format.

4 Claims, 19 Drawing Sheets

| | A | B | C | D | E |
|---|---|---|---|---|---|
| 1 | MS Apps World-wide revenue | | | | |
| 2 | | FY '91 | | | |
| 3 | | Jan | Feb | Mar | Qtr 1 |
| 4 | MS World | | | | |
| 5 | MS US | | | | |
| 6 | Excel | 500 | 600 | 700 | 1800 |
| 7 | Word | 400 | 500 | 600 | 1500 |
| 8 | Project | 300 | 400 | 500 | 1200 |
| 9 | PowerPoint | 200 | 300 | 400 | 900 |
| 10 | Total US | 1400 | 1800 | 2200 | 5400 |
| 11 | MS EUR | | | | |
| 12 | Excel | 500 | 600 | 700 | 1800 |
| 13 | Word | 400 | 500 | 600 | 1500 |
| 14 | Project | 300 | 400 | 500 | 1200 |
| 15 | PowerPoint | 200 | 300 | 400 | 900 |
| 16 | Total EUR | 1400 | 1800 | 2200 | 5400 |
| 17 | Total World | 2800 | 3600 | 4400 | 10800 |

*Figure 2a*

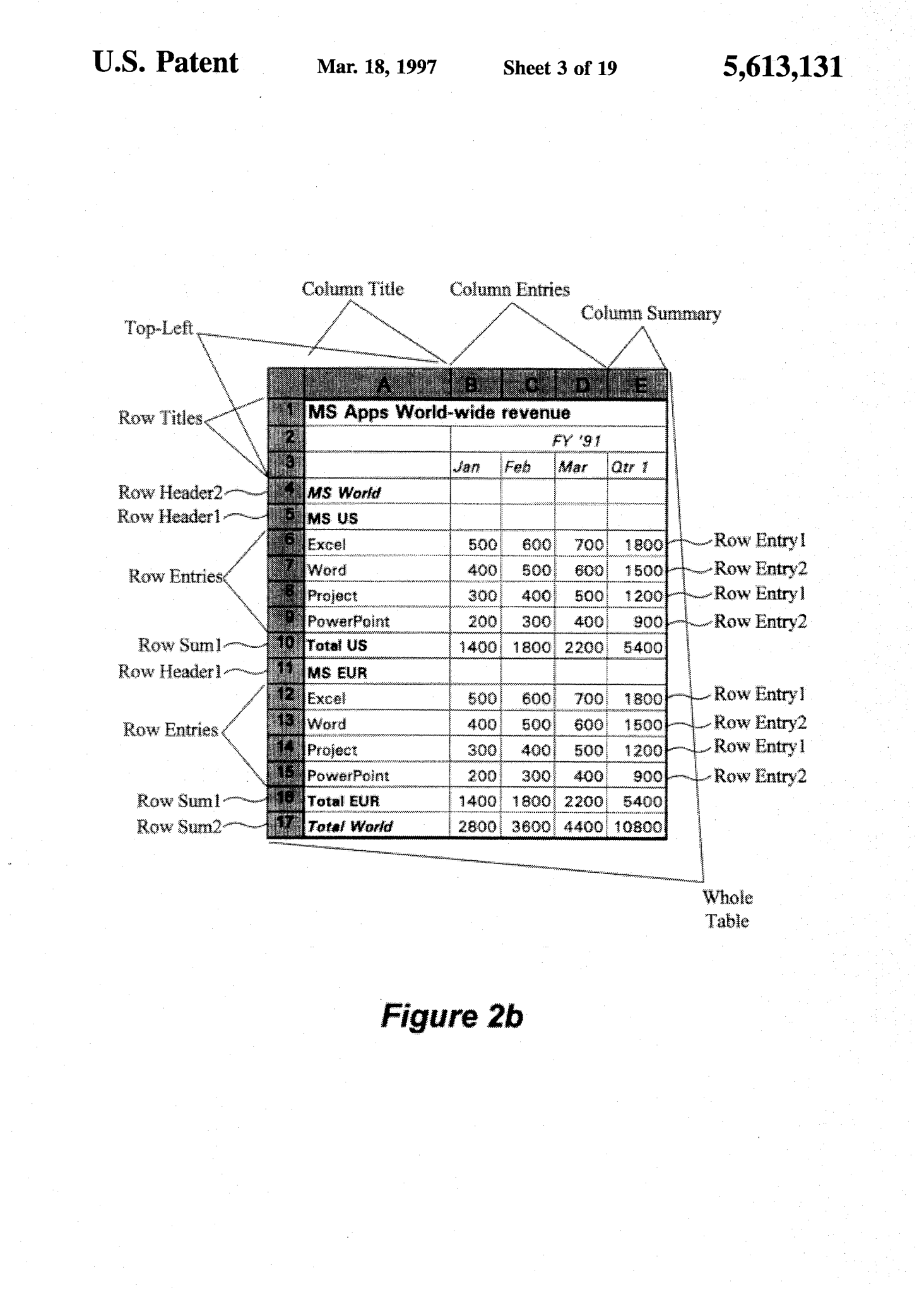

| | A | B | C | D | E |
|---|---|---|---|---|---|
| 1 | **MS Apps World-wide revenue** | | | | |
| 2 | | *FY '91* | | | |
| 3 | | *Jan* | *Feb* | *Mar* | *Qtr 1* |
| 4 | ***MS World*** | | | | |
| 5 | **MS US** | | | | |
| 6 | Excel | 500 | 600 | 700 | 1800 |
| 7 | Word | 400 | 500 | 600 | 1500 |
| 8 | Project | 300 | 400 | 500 | 1200 |
| 9 | PowerPoint | 200 | 300 | 400 | 900 |
| 10 | **Total US** | 1400 | 1800 | 2200 | 5400 |
| 11 | **MS EUR** | | | | |
| 12 | Excel | 500 | 600 | 700 | 1800 |
| 13 | Word | 400 | 500 | 600 | 1500 |
| 14 | Project | 300 | 400 | 500 | 1200 |
| 15 | PowerPoint | 200 | 300 | 400 | 900 |
| 16 | **Total EUR** | 1400 | 1800 | 2200 | 5400 |
| 17 | ***Total World*** | 2800 | 3600 | 4400 | 10800 |

*Figure 2b*

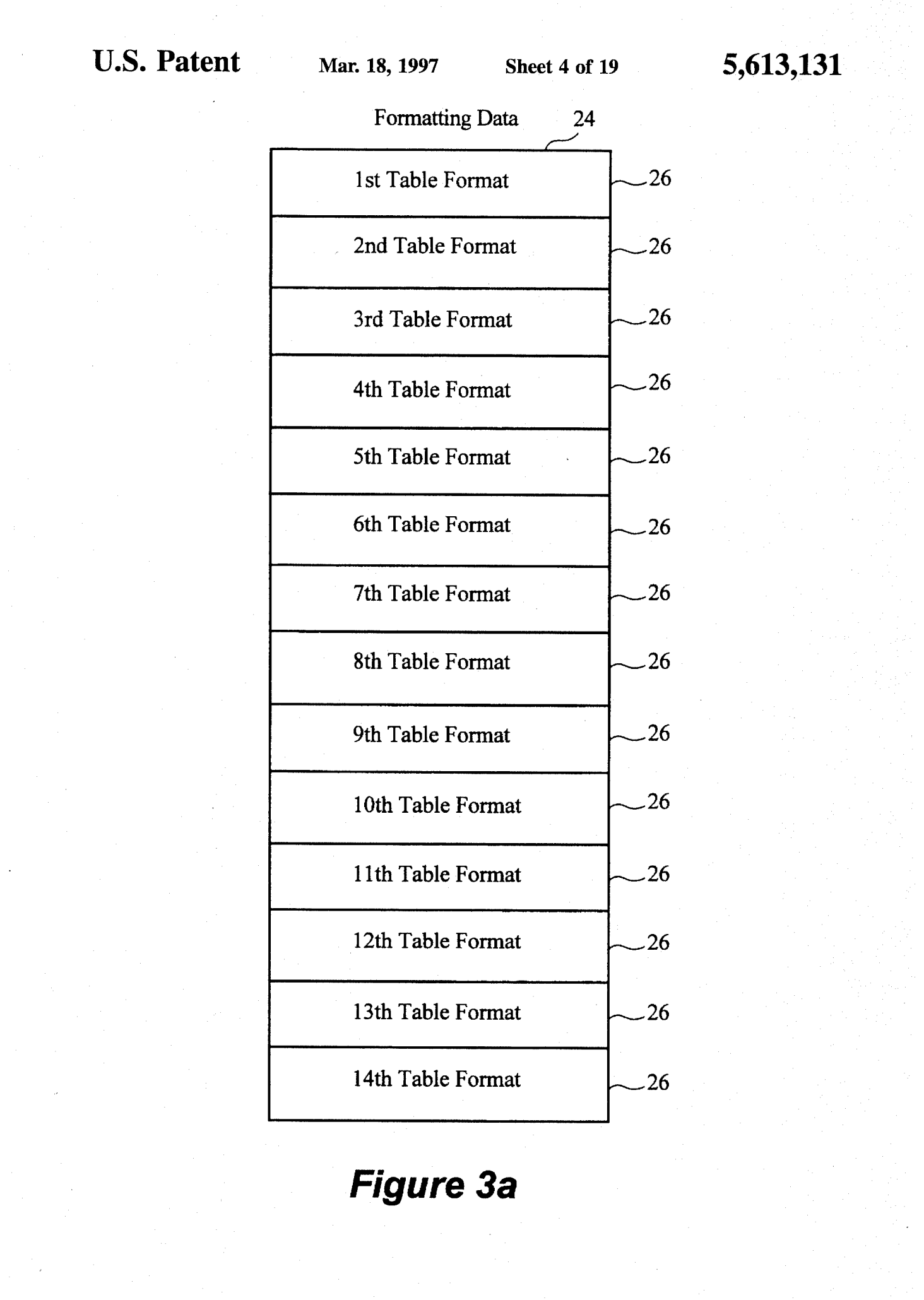

Formatting Data 24

| |
|---|
| 1st Table Format (26) |
| 2nd Table Format (26) |
| 3rd Table Format (26) |
| 4th Table Format (26) |
| 5th Table Format (26) |
| 6th Table Format (26) |
| 7th Table Format (26) |
| 8th Table Format (26) |
| 9th Table Format (26) |
| 10th Table Format (26) |
| 11th Table Format (26) |
| 12th Table Format (26) |
| 13th Table Format (26) |
| 14th Table Format (26) |

Figure 3a

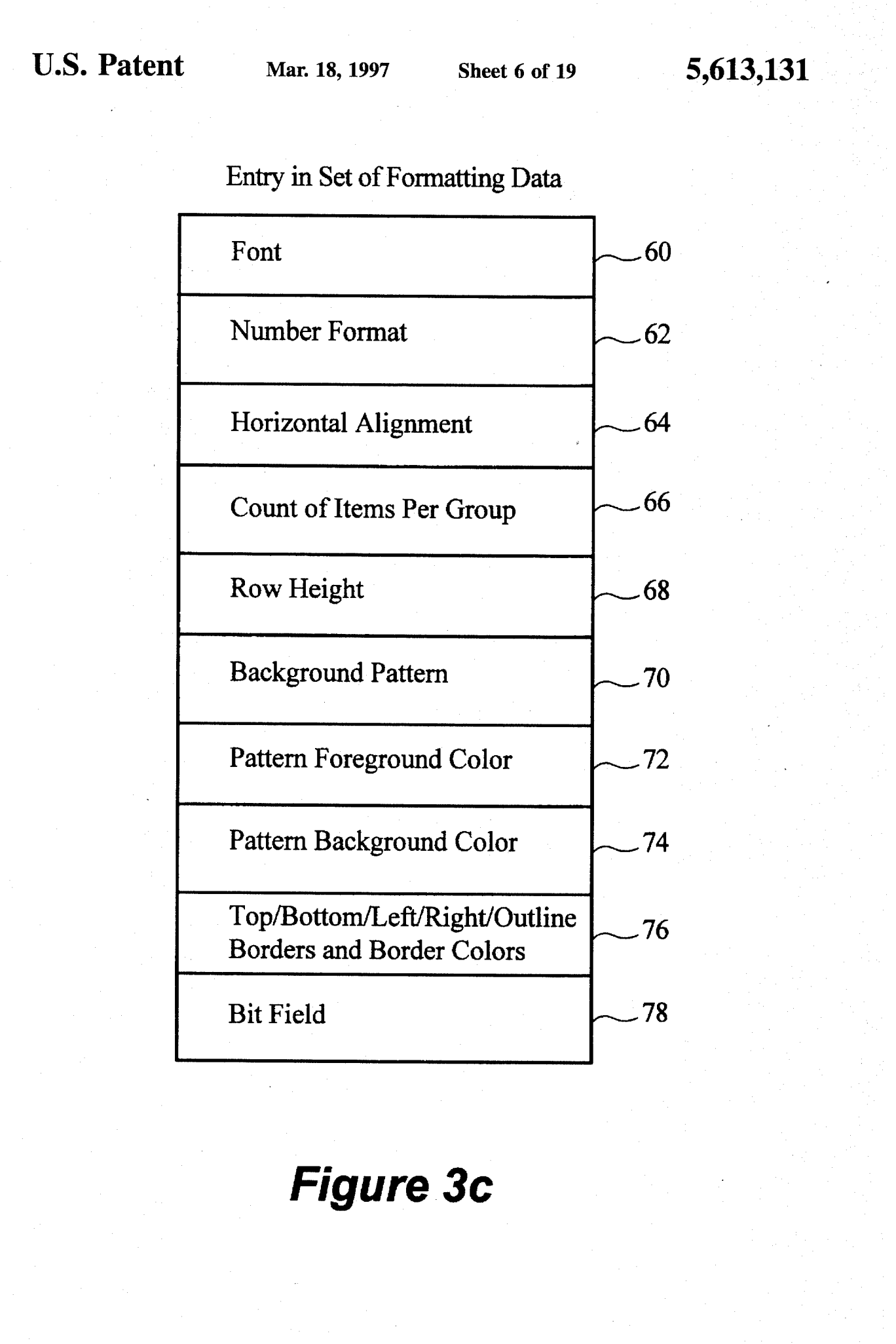

Entry in Set of Formatting Data

| | |
|---|---|
| Font | 60 |
| Number Format | 62 |
| Horizontal Alignment | 64 |
| Count of Items Per Group | 66 |
| Row Height | 68 |
| Background Pattern | 70 |
| Pattern Foreground Color | 72 |
| Pattern Background Color | 74 |
| Top/Bottom/Left/Right/Outline Borders and Border Colors | 76 |
| Bit Field | 78 |

Figure 3c

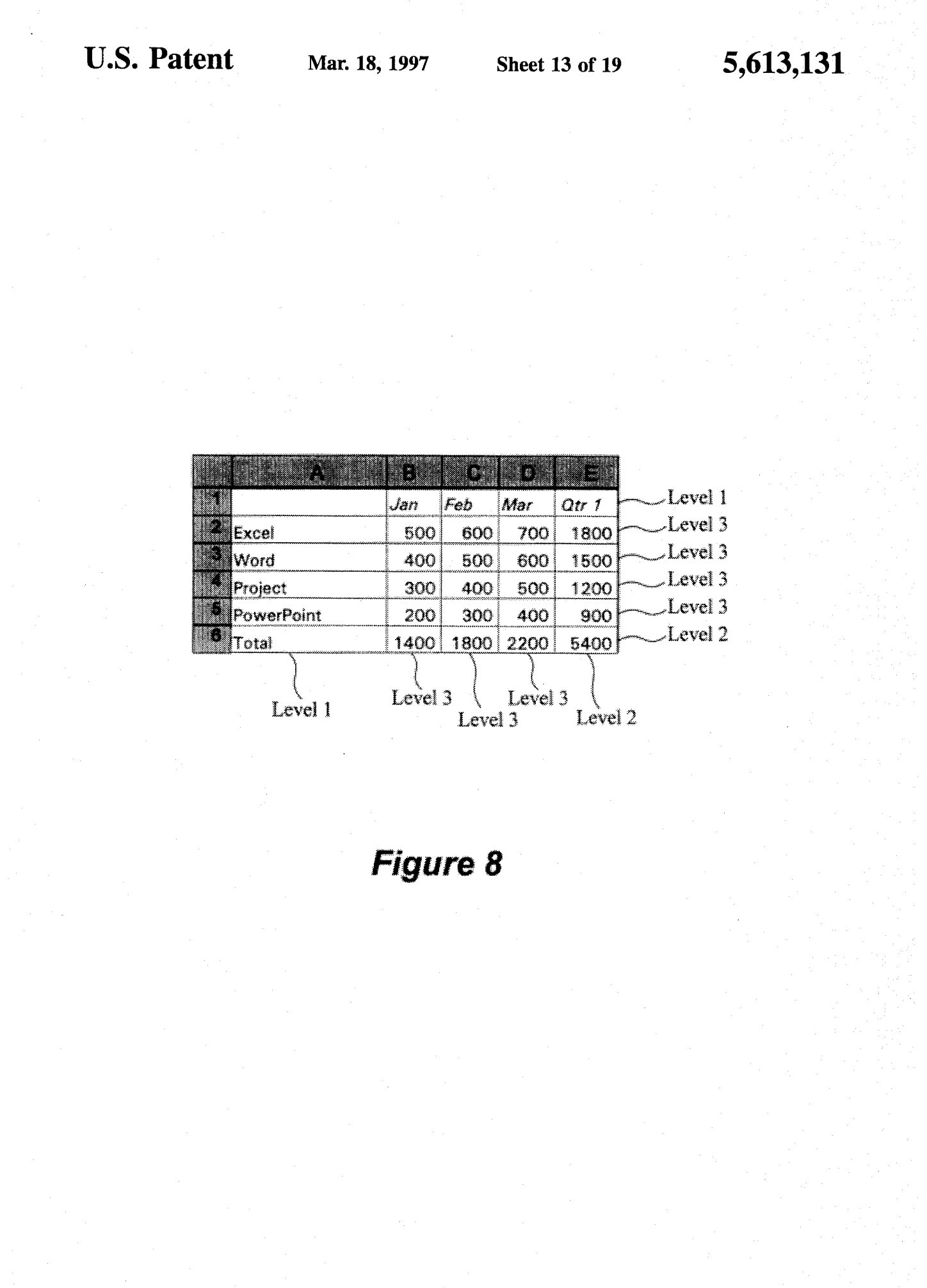

| | A | B | C | D | E |
|---|---|---|---|---|---|
| 1 | | *Jan* | *Feb* | *Mar* | *Qtr 1* |
| 2 | Excel | 500 | 600 | 700 | 1800 |
| 3 | Word | 400 | 500 | 600 | 1500 |
| 4 | Project | 300 | 400 | 500 | 1200 |
| 5 | PowerPoint | 200 | 300 | 400 | 900 |
| 6 | Total | 1400 | 1800 | 2200 | 5400 |

*Figure 8*

AUTO-FORMATTING OF TABLES IN A SPREADSHEET PROGRAM

TECHNICAL FIELD

The present invention relates generally to data processing systems and, more particularly, to auto-formatting of tables in a spreadsheet program run on a data processing system.

BACKGROUND OF THE INVENTION

Spreadsheet programs, such as Microsoft Excel spreadsheet program, Version 3.0, sold by Microsoft Corporation of Redmond, Wash., provide a user with the ability to generate tables in a spreadsheet. The user is given the ability to format the tables through formatting commands. Unfortunately, many users of such spreadsheet programs have not mastered the formatting commands and have difficulty in using the formatting commands to produce a table that is aesthetically appealing and professional looking. As a result, the tables produced by many users are less than optimal.

SUMMARY OF THE INVENTION

It is, therefore, an object of the present invention to provide predefined table formats that allow a user to automatically format his table into a aesthetically appealing and professional-looking table.

In accordance with a first aspect of the present invention, a method is practiced in a data processing system that has a memory and a processing means. The processing means runs a spreadsheet program. In accordance with this method, a table that is part of a spreadsheet is automatically formatted by performing a number of steps. First, formatting information for predefined table formats is stored in the memory. Each predefined table format stores formatting information for constituent table parts. One of the predefined table formats is selected to be used in formatting the table. The constituent table parts of the table are identified using the processing means. The constituent table parts of the table are formatted with the processing means according to the formatting information stored in memory for the constituent table parts of the selected predefined table format. The step of identifying the constituent table parts of the table may identify any of a number of different types of constituent table parts. These table parts include a row title, a column title, a row header, a column header, a top-left portion of the table, a row summary, a column summary, a row entry that holds data or a column entry that holds data.

Moreover, the step of determining the constituent table parts may involve applying heuristics to guess the table structure. Determining constituent table parts may also involve examining dependencies between rows or between columns in the table, creating a ranking of rows or columns based on the dependencies and using the hierarchy to identify the constituent table parts.

The step of formatting the constituent table parts may format each successive constituent table part using the formatting information stored as the predefined table format.

In accordance with another aspect of the present invention, a predefined format is selected to be used in formatting a first table having a table structure that includes a number of rows and columns. The first table is then formatted into the predefined table format using the processing means. A second table, having a table structure that includes a number of rows and columns, is also formatted into the predefined format using the processing means. The second table differs from the first table in its table structure. For instance, a second table may have a different number of rows than the first table or a different number of columns than the first table. Furthermore, the second table may have both a different number of rows and a different number of columns than the first table.

The step of formatting the first table or the step of formatting the second table may include the following steps. First, constituent table parts of the respective table are determined. Second, the determined constituent table parts are formatted to effect the desired formatting of the table.

In accordance with yet another aspect of the present invention, a method of automatically formatting a table is performed in a data processing system. In this method, a predefined table format is provided and selected for formatting the table. The table is formatted into the predefined table format by first identifying a first row of data in the table. A dollar sign is added before each entry in the first row of data in the table and decimal points are added to each entry of the table that contains financial data. Furthermore, rows of totals are found in the table, and a dollar sign is added before each entry in the rows of totals in the table. The final row of totals may then be formatted in a special format. The table may be formatted in this fashion if it contains data that specifies dollar amounts. If, for instance, the table contains percentage data, the dollar signs and decimal places are not added.

In accordance with a further aspect of the present invention, a table is provided that has multiple row headers and at least one data row. A first level is assigned to the row header that is closest to the data row, and a second level is assigned to the row header that is next closest to the data row. The assigned levels are used to differently format the row headers. This method may also include the additional step of assigning a third level to any additional row header in the table.

In accordance with still another aspect of the present invention, a table is provided that has constituent table parts, including a user-specified structure. The constituent parts of the table are identified using the processing means, and a user-selected predefined table format is applied to the table by formatting each constituent part.

BRIEF DESCRIPTION OF THE DRAWINGS

A preferred embodiment of the present invention will be described below with reference to the drawings. The drawings include the following Figures.

FIG. 2*a* is an illustration of a table prior to formatting by the preferred embodiment of the present invention.

FIG. 2*b* is an illustration of how the table of FIG. 2*a* appears after it has been formatted by the preferred embodiment of the present invention.

FIG. 3*a* is a block diagram illustrating the format of formatting data used by the preferred embodiment of the present invention.

FIG. 3*c* is a block diagram illustrating the format of an entry in the set of formatting data of FIG. 3*b*.

FIG. 8 is an illustrative table that has been processed by executing the steps of FIG. 7*b*.

DETAILED DESCRIPTION OF THE INVENTION

A preferred embodiment of the present invention described herein provides a user of a spreadsheet program with a selection of predefined table formats. The user may select one of the predefined table formats to cause a table to be automatically formatted into the selected format. The table format may be selected by clicking a mouse or pointing device over a menu selection for the desired table format. As a result, a user of the preferred embodiment described herein quickly and easily obtains an aesthetically appealing and professional-looking table.

The preferred embodiment of the present invention operates by determining a structure of the range of cells that form the table to be formatted and then formatting the table using the determined structure. The table structure is determined using a number of heuristics, which will be described in more detail below. The necessity of first determining table structure stems from the storage format of the formatting information in the table formats. In particular, the formatting information stored internally according to the part of the table that is to be formatted by the formatting information. For instance, certain formatting information may be stored for the whole table, whereas other formatting information may be stored for parts of the table, such as row headers. The storage of such formatting information will be described in more detail below. Hence, the table structure must be properly discerned before the formatting information may be correctly applied to the respective table parts.

The preferred embodiment may be implemented as code that is integrated directly into a spreadsheet program. Alternatively, the preferred embodiment may be realized as code that constitutes a separate module which works in conjunction with a spreadsheet program. In both instances, the code may be realized as software or firmware.

Figure 1:
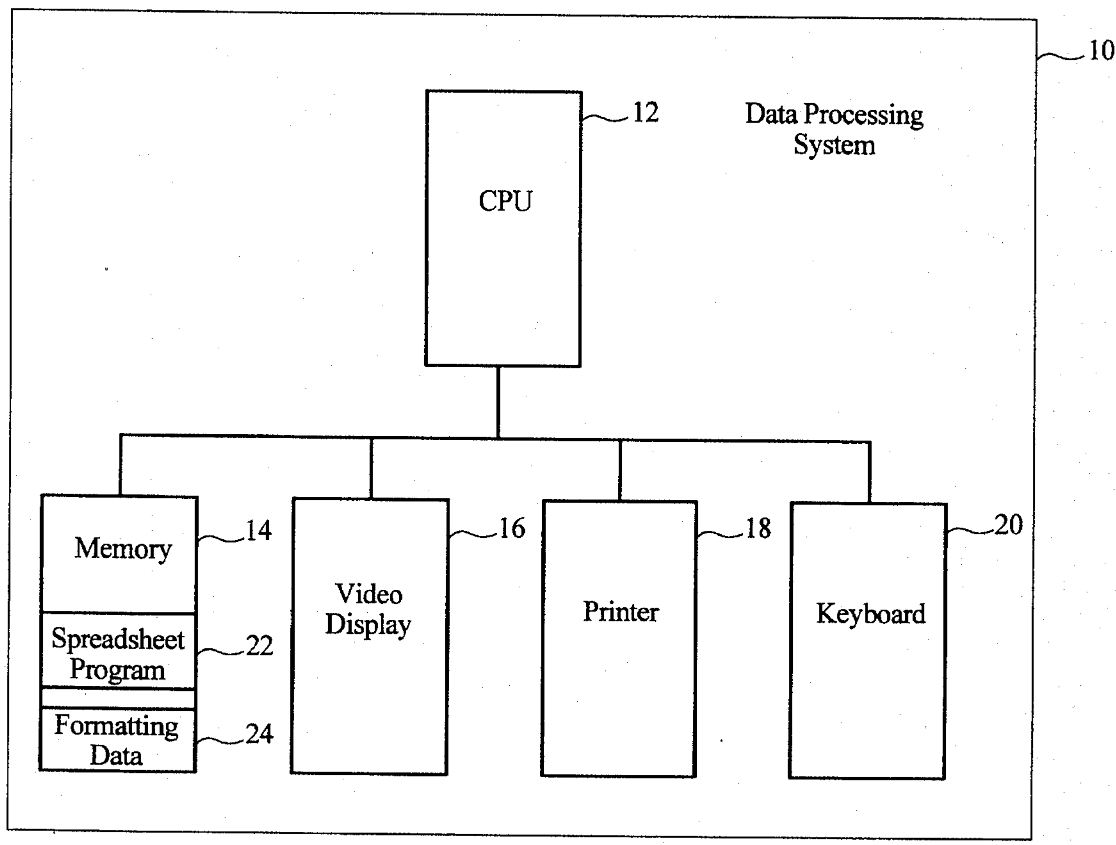
FIG. 1 is a block diagram of a data processing system that is suitable for practicing a preferred embodiment of the present invention.

FIG. 1 is a block diagram of an illustrative data processing system 10 for practicing the preferred embodiment of the present invention. The data processing system 10 includes a central processing unit (CPU) 12 that has access to a memory 14, a video display 16, a printer 18 and a keyboard 20. The memory 14 holds the code for a spreadsheet program 22. The code for practicing the preferred embodiment of the present invention is integrated directly into the spreadsheet program 22. The memory 14 also holds formatting data 24, which will be described in more detail below.

In order to understand how the preferred embodiment of the present invention operates, it is helpful to examine the constituent parts into which a table is divided. FIG. 2*a* shows an example of a table before the table is formatted by the preferred embodiment. FIG. 2*b*, in contrast, shows the same table after the table has been formatted by the preferred embodiment. FIG. 2*b* includes labels for many of the constituent table parts for which formatting information is stored by the preferred embodiment.

The first constituent part of the table is the "whole table," which includes all of the elements of the table. A table may also include title areas (i.e., areas which include only text and do not include any data). The example table shown in FIG. 2*b* has both "row titles" (i.e., rows holding only title information) and "column titles" (i.e., columns holding only title information). The intersection of the row title area with the column title area forms a constituent part known as the "top-left" of the table. The name "top-left" for this area is derived from the positioning of the title area in the top-left corner of the table. "Row headers" and "column headers" lying outside of the title area are also identified by the preferred embodiment. In the example table shown in FIG. 2*b*, the rows containing "MS World" and "MS US" are examples of row headers. No column headers are shown in the example table of FIG. 2*b*, but it should be appreciated that such column headers are analogous to row headers (except that they are for columns rather than rows).

The rows and columns holding data are also divided into "row entries" (see "row entry1" and "row entry2" in FIG. 2*b*) and "row summaries" (see "row sum1" and "row sum2" in FIG. 2*b*). Row entries hold data and are differentiated by type when the predefined table format uses alternate shading of rows. Row summaries hold sums of data from the entry rows (i.e., they are rows holding totals). Similarly, the table is divided into "column entries" and "column summaries." (See "column sum" in FIG. 2*b* .) Moreover, the "row summaries," (such as "row sum1" and "row sum2") may be divided into hierarchical levels, as will be described in more detail below.

Figure 3B:
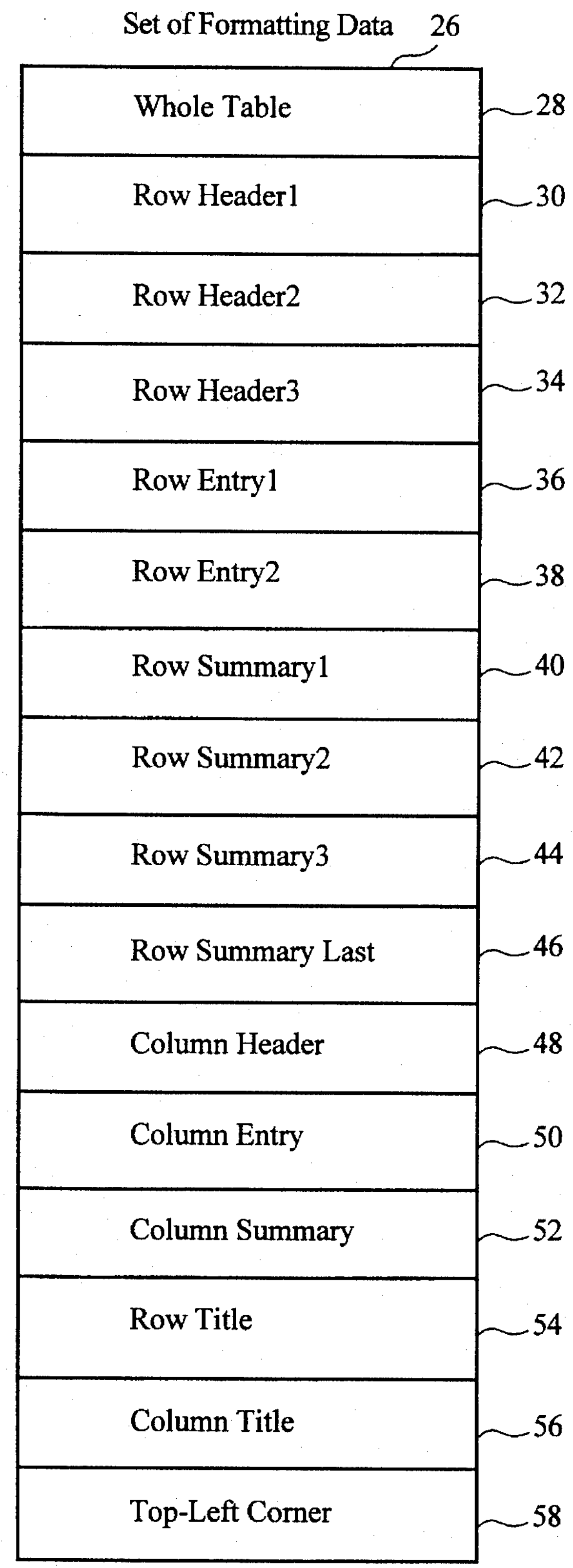
FIG. 3*b* is a block diagram illustrating the format of a set of formatting data as shown in FIG. 3*a*.

The preferred embodiment of the present invention relies on a number of data structures that enable it to perform auto-formatting of tables in accordance with the table format selected by the user. FIG. 3*a* is a block diagram depicting the formatting data 24. The formatting data 24 holds formatting information for fourteen different table formats. As can be seen in FIG. 3*a*, a separate set of formatting data 26 is provided for each of the fourteen table formats (ranging from the 1st table format to the 14th table format). FIG. 3*b* shows an example of a set of formatting data 26 in more detail. As was mentioned above, the formatting information is stored by constituent table parts. Hence, the set of formatting data 26 includes a separate entry for each respective part of a table.

Entry 28 holds formatting information for the whole table. Entries 30, 32, and 34 hold formatting information for respective levels of row headers. Entries 36 and 38 hold formatting information for row entries. Furthermore, entries 40, 42 and 44 hold formatting information for respective levels of row summaries. Entry 46 is provided for the last row summary.

A set of entries for holding formatting information for columns is also provided in the set of formatting data 26. In particular, entry 48 holds formatting information for a column header, whereas entry 50 holds formatting information for a column entry. In addition, entry 52 holds formatting information for a column summary. Lastly, the set of formatting data includes entry 54 that holds formatting information for a row title, entry 56 that holds formatting information for a column title and entry 58 that holds formatting information for the top-left corner of the table.

Each of the entries of a set of formatting data 26 (as shown in FIG. 3*b*) includes the same fields. These fields are shown in FIG. 3*c*. Some of the fields may not be used for different portions of the table. Some of the fields are only used by select parts of the table. The fields in each entry include a font field 60 that specifies the relative font size (expressed relative to a standard font size) to be used for the part of the table that is associated with the entry. A number format field 62 specifies the format of numbers in the associated part of the table. A horizontal alignment field 64 specifies the alignment of the associated part of the table. A group field 66 holds a count of items comprising a count that is used when the selected table format requires alternate row shading. The count specifies the number of items, such as rows, that are to be included in the group for a given shading. A row height field 68 holds a number of units of height to be assigned to the associated part of the table. A background pattern field 70 holds a specifier of a background pattern to be used in formatting the table. A pattern foreground color field 72 and a pattern background color field 74 are also included. Field 76 is used for storing information regarding the top/bottom/left/right/outline borders and their associated colors. Lastly, a bit field 78 is included.

As was mentioned above, the preferred embodiment of the present invention generally proceeds by determining the table structure and then applying appropriate formats to the respective parts of the table. The formatting data 24 (FIG. 3*a*) includes appropriate formatting data for each of these constituent parts of the table of each of the possible fourteen different predefined table formats. The formatting information shown in FIG. 3*c* is stored for each predefined table format according to the constituent parts of the table as shown, for example, in FIG. 2*b*. Accordingly, once the table has been broken down into constituent parts, the appropriate stored formats are applied to each of the constituent parts. As a result, the table is automatically converted into the appropriate predefined table format. It should be noted that any formatting that has been applied to the table before the predefined table format is selected is ignored unless the user explicitly specifies that certain formatting is not to go ignored. Specifically, a dialog may be provided that allows a user to select certain formatting characteristics when using auto-formatting.

Figure 4:
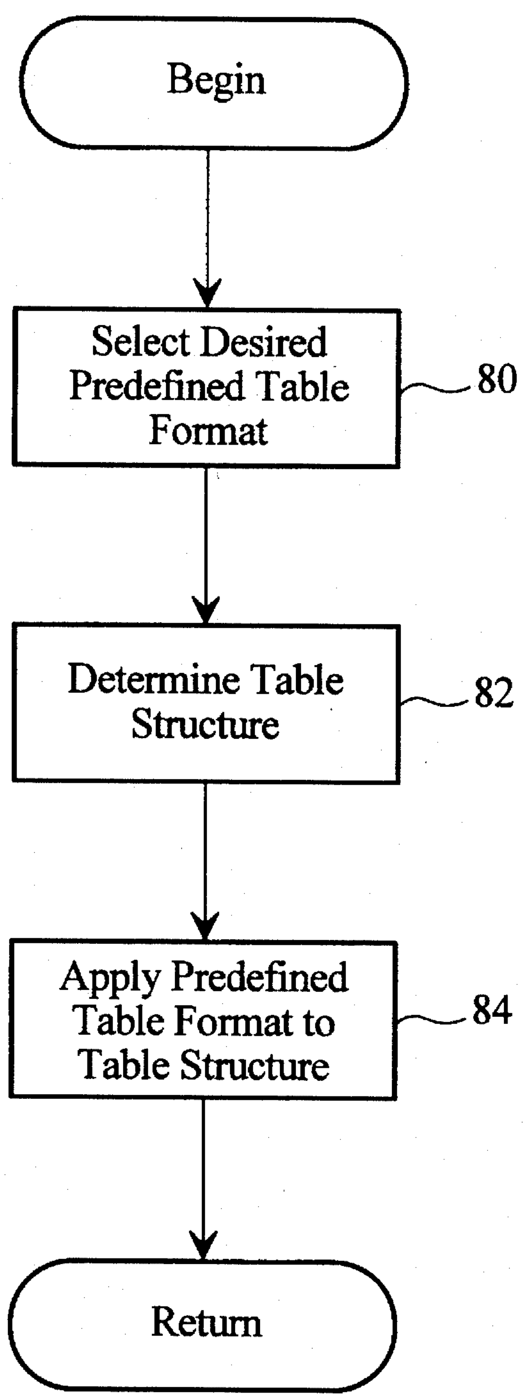
FIG. 4 is a flowchart showing an overview of the steps performed by the preferred embodiment of the present invention.

FIG. 4 shows a flowchart depicting an overview of the steps performed by the preferred embodiment described herein. Specifically, a user selects a desired predefined table format (step 80). The selection of the predefined user format is accomplished through a user interface (such as a menu), which lists the different formats available to the user and asks the user to select one of the formats. The preferred embodiment then determines the table structure (step 82) and applies the predefined table format to the table structure (step 84). The step of determining the table format includes a determination of the cells that belong in the table when only a single cell is currently active, as will be described in more detail below. The step of applying the predefined table format to the table structure in step 84 involves reading the formatting information held in fields 60, 62, 64, 66, 68, 70, 72, 74, 76, and 78 (FIG. 3*c*) for each of the constituent parts of the table. Steps 82 and 84 are shown as separate steps in FIG. 4 but may be integrated in an iterative approach. For instance, as will be described in more detail below, the whole table structure is determined and then the whole table format is applied before other constituent parts of the table are determined and formatted.

The steps of determining the table structure (step 82 in FIG. 4) and applying the predefined table format to the table structure (step 84) will now be described in more detail.

Figure 5A:
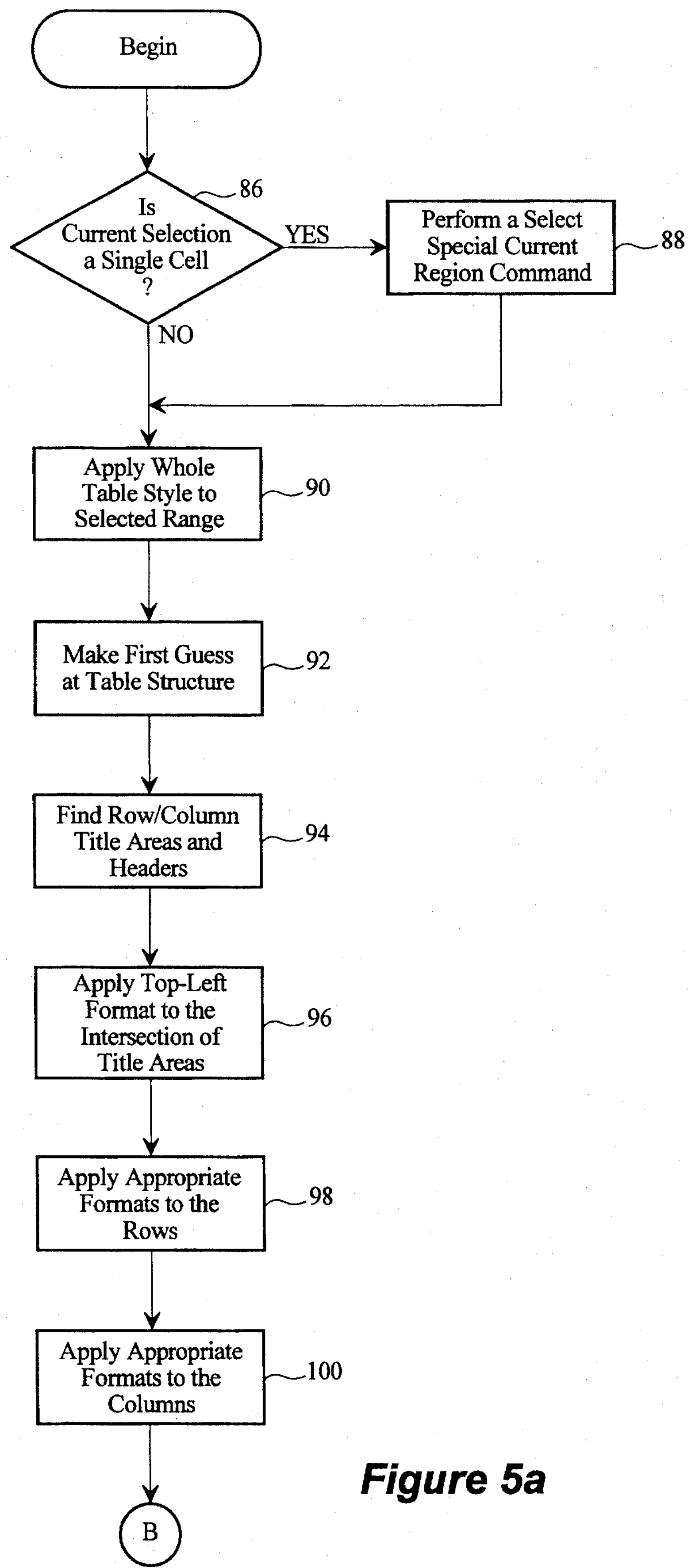
FIGS. 5*a* and 5*b* are flowcharts illustrating the steps performed by the preferred embodiment of the present invention in determining table structure and applying a predefined table format to the determined table structure.
Figure 5B:
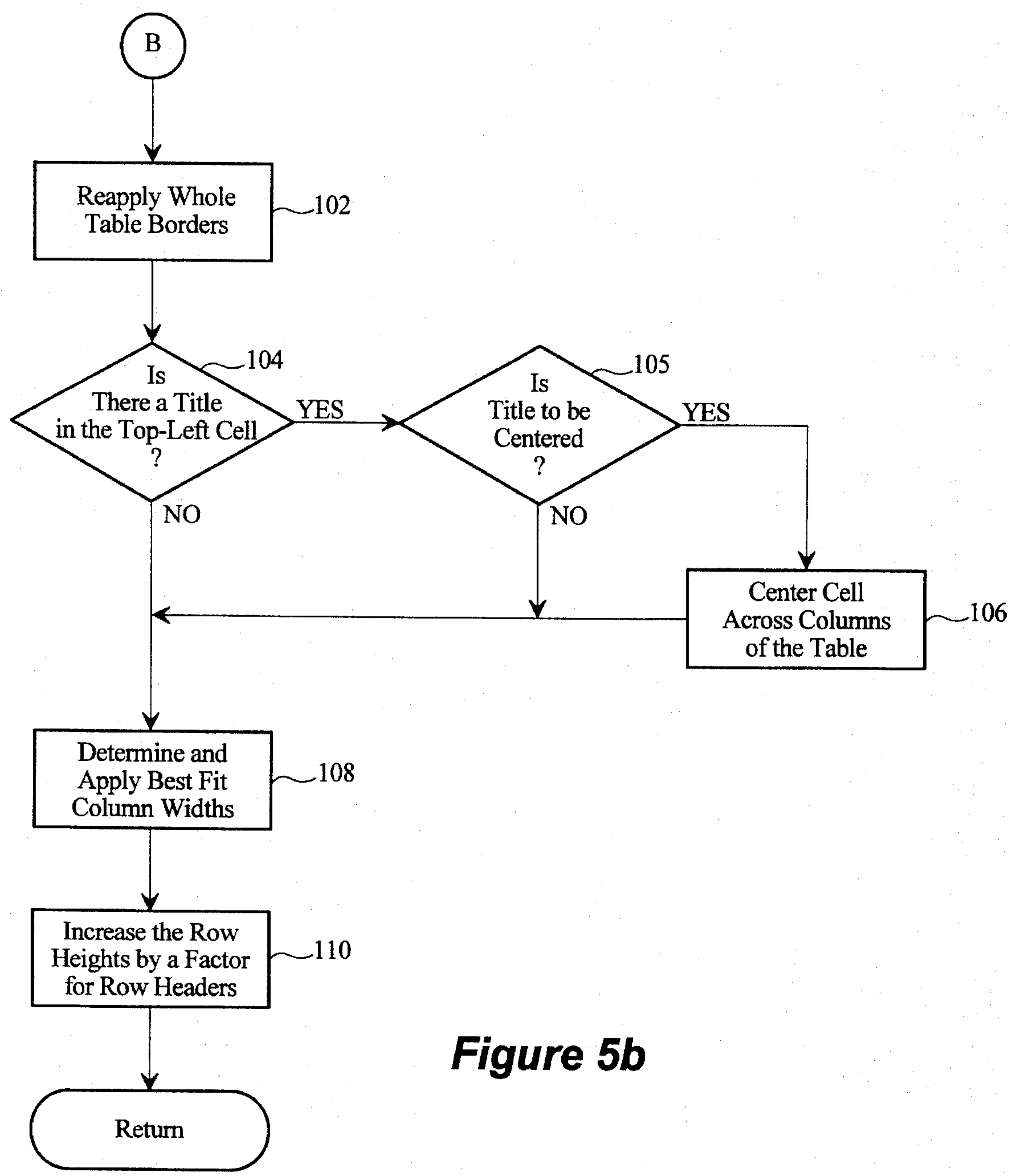

FIGS. 5*a* and 5*b* show a flowchart depicting the steps performed by the preferred embodiment in determining the table structure and applying the preselected table format to the table. Initially, the processing system 10 determines whether the current selection is a single cell (step 86 in FIG. 5*a*). If the current selection is a single cell, a "select special current region" command is executed (step 88).

Figure 6:
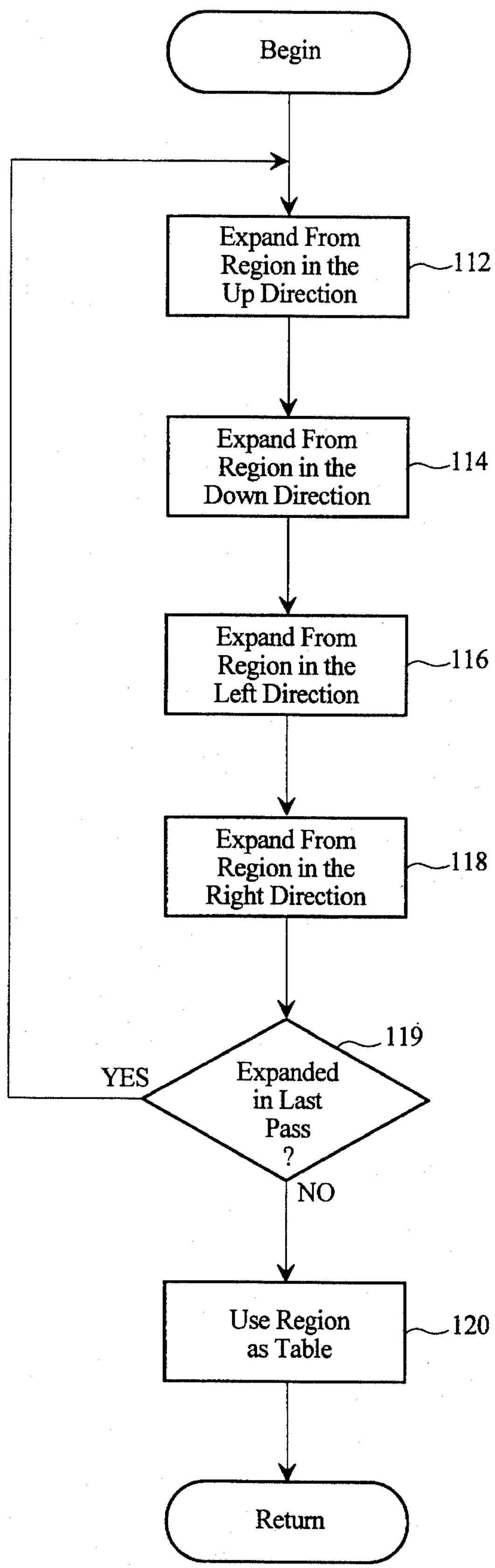
FIG. 6 is a flowchart illustrating in more detail how a select special current region command of FIG. 5*a* is performed.

The select special current region command serves to gather a range that is presumed to constitute the table. FIG. 6 shows a flowchart depicting the steps performed in executing the select special current region command. Initially, the active cell is the region from which expansion is initiated. First, the preferred embodiment looks in the up direction to expand the region provided in the table. The preferred embodiment described herein looks for all successively adjacent cells in the up direction which are non-empty. The region is expanded from the active cell in the up direction to encompass all these non-empty successively adjacent cells (step 112 in FIG. 6). Such expansion is then repeated in the remaining down, left and right directions (steps 114, 116 and 118). If any expansion occurred in steps 112, 114, 116 and 118, the steps are repeated again using the expanded region as a region from which expansion is initiated (see step 119). Once a pass occurs in which there is no expansion, the expanded region is used as the range for the table (step 120).

Once a range has been found for the table that has more than one cell, a whole table style is then applied to the selected range (step 90 in FIG. 5*a*). In applying the whole table style to the selected range, the preferred embodiment described herein looks at the set of formatting data 26 for the selected table format and examines entry 28 (FIG. 3*b*) for a whole table portion of the table. The preferred embodiment looks at fields 60, 62, 64, 66, 68, 70, 72, 74, 76, and 78 and formats the whole table based upon information contained in these fields.

Figure 7A:
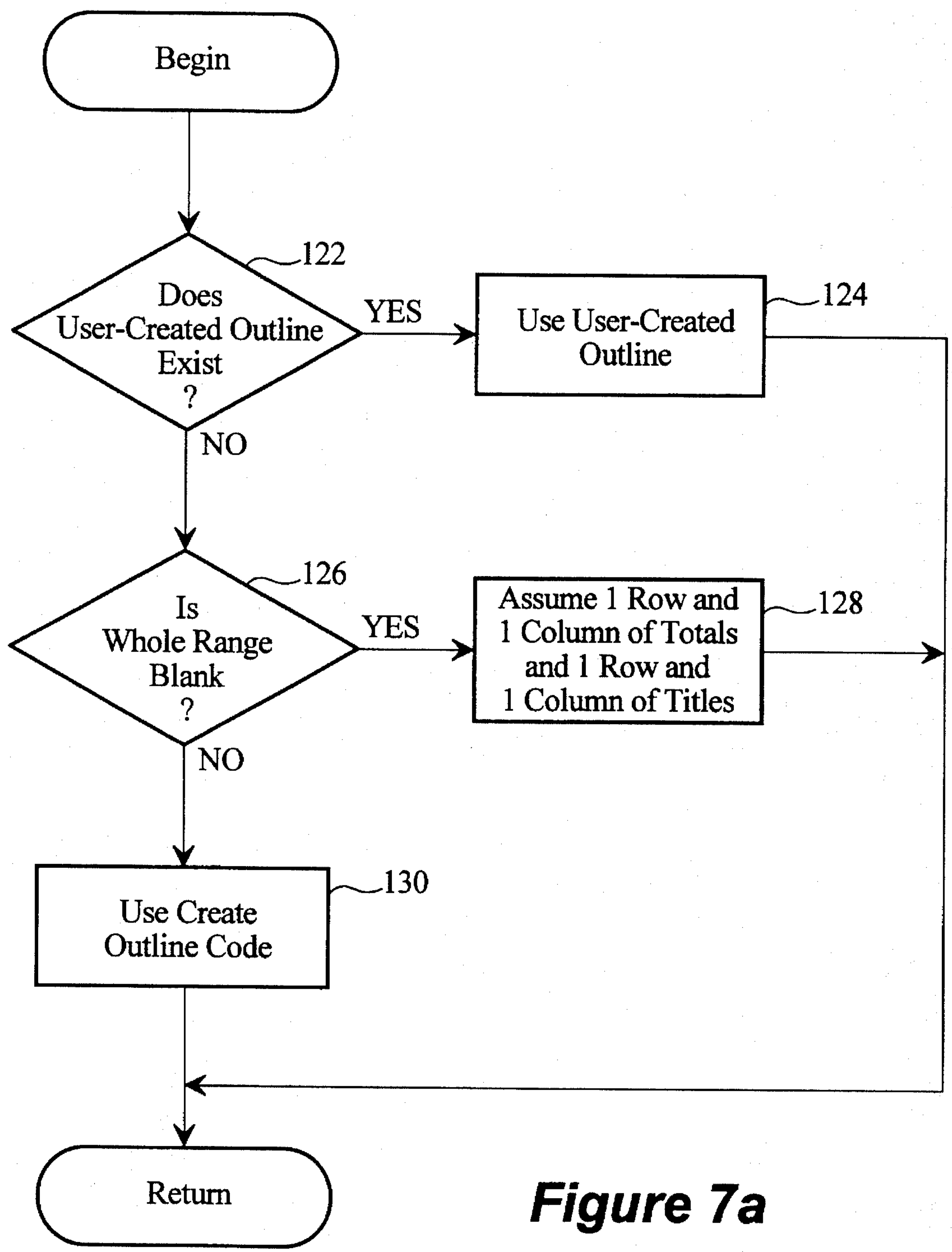
FIG. 7*a* is a flowchart illustrating in more detail how the step of making a first guess at the table structure of FIG. 5*a* is performed.

Once the whole table style has been applied to the selected range (i.e., step 90), the preferred embodiment makes a first guess at the table structure (step 92). FIG. 7*a* shows a flowchart of the steps performed in making the first guess of the table structure. First, the preferred embodiment checks whether a user-created outline exists (step 122). Spreadsheet programs, such as Microsoft Excel spreadsheet, version 4.0, allow a user to specify hierarchical relationships between rows/columns in outline form. The user-created outline holds the respective hierarchical level information for the rows/columns and will be used if it exists (step 124). This outline will be described in more detail below.

If a user-created outline does not exist, the preferred embodiment described herein checks whether the whole selected range is blanks(step 126). If the whole range is blank, the preferred embodiment assumes that there is one row of totals, one column of totals, one row of titles, and one column of titles (step 128). However, if the whole range is not blank, a Create Outline code is executed (step 130). The Create Outline code is the code that allows a user to create an outline.

Figure 7B:
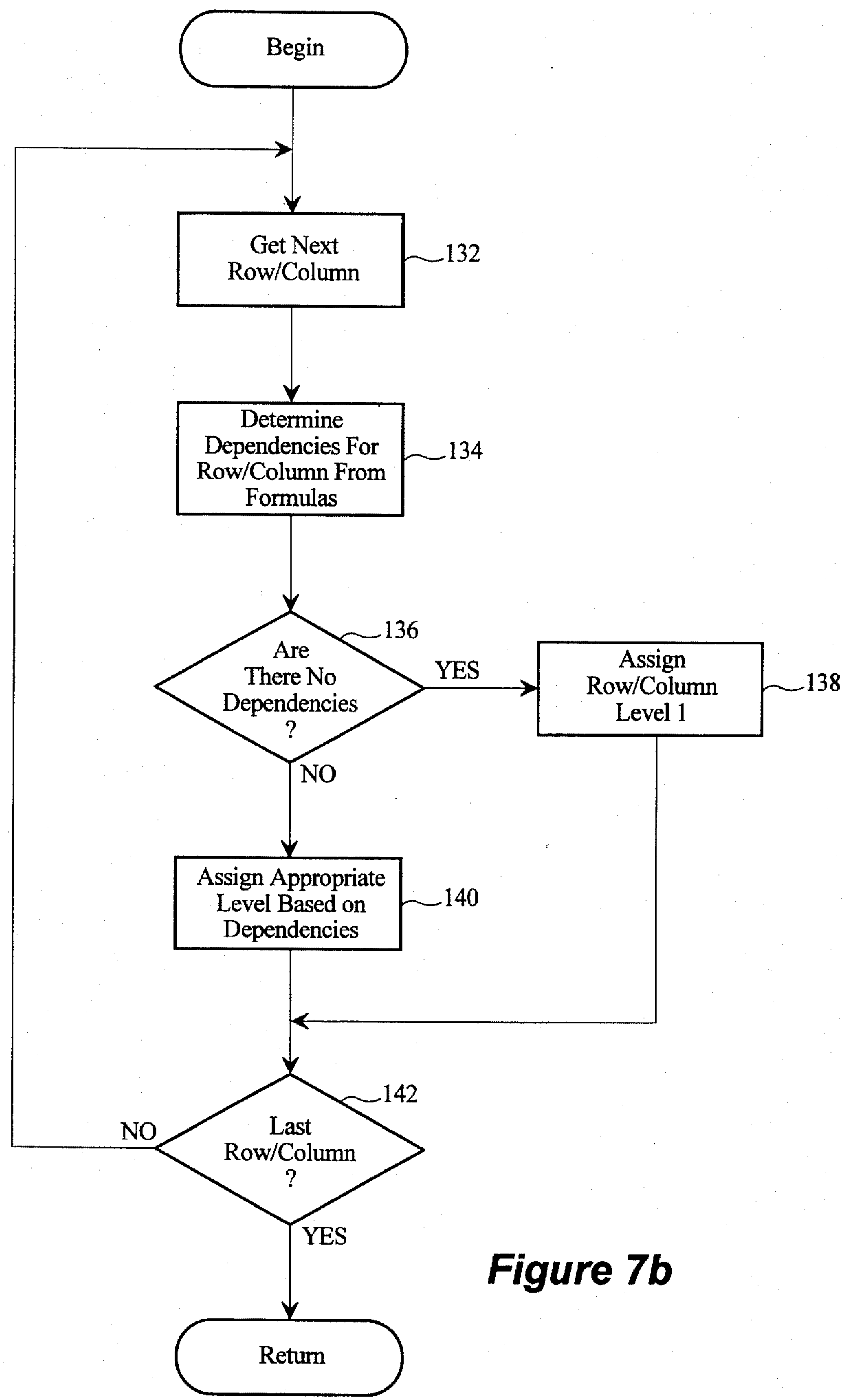
FIG. 7*b* is a flowchart illustrating in more detail the step of FIG. 7*a* of creating an outline.

FIG. 7b shows a flowchart of the steps performed by the Create Outline code. The steps shown in FIG. 7b are repeated first for rows and then subsequently for columns. The designation row/column is used in FIG. 7b to indicate that the same steps are repeated for the columns as are performed for the rows. First, the next row/column is obtained (step 132 in FIG. 7b) and dependencies for the row/column are obtained from formulas stored by the spreadsheet program 22 for the row/column (step 134). Spreadsheet programs, such as Microsoft Excel spreadsheet, version 4.0, allow a user to specify dependencies between rows/columns. These dependencies are defined by the formulas which specify how values in the rows/columns are to be calculated. Consider the example table shown in FIG. 8. This table includes five rows of data held in rows 2 through 6 and four columns of data held in rows B through E. Formulas are stored indicating that row 6 is the sum of rows 2, 3, 4 and 5. Analogously, formulas are stored indicating that column E is the sum of columns B, C and D. By examining these formulas, the preferred embodiment is able to discern the appropriate dependency information and assign appropriate levels to the rows/columns, as will be described in more detail below.

In step 136 (FIG. 7b), a determination is made whether there are any dependencies for the row/column in their formulas. If there are no dependencies, the row/column is assigned a level of level 1 (step 138 in FIG. 2b). In the example table of FIG. 8, column A and row 1 have no dependencies, and thus, each is assigned a level of 1. If the row/column has dependencies, an appropriate level is assigned to the row/column based upon the determined dependencies (step 140). From the formulas it is known that row 6 is the sum of rows 2 through 5. As such, row 6 is assigned a level of 2, and rows 2 through 5 are assigned a level of 3 (i.e., a level lower than row 6). The level 2 assigned to row 6 indicates that it is higher in the hierarchy than the level 3 rows. Similarly, column E is assigned a level of 2, whereas columns B, C and D are assigned a level of 3.

Once the appropriate levels have been assigned based upon the dependencies (i.e., step 140 in FIG. 7b), a check is made whether a last row/column has been examined (step 142). If a row/column remains, the above-described steps are repeated.

Figure 9A:
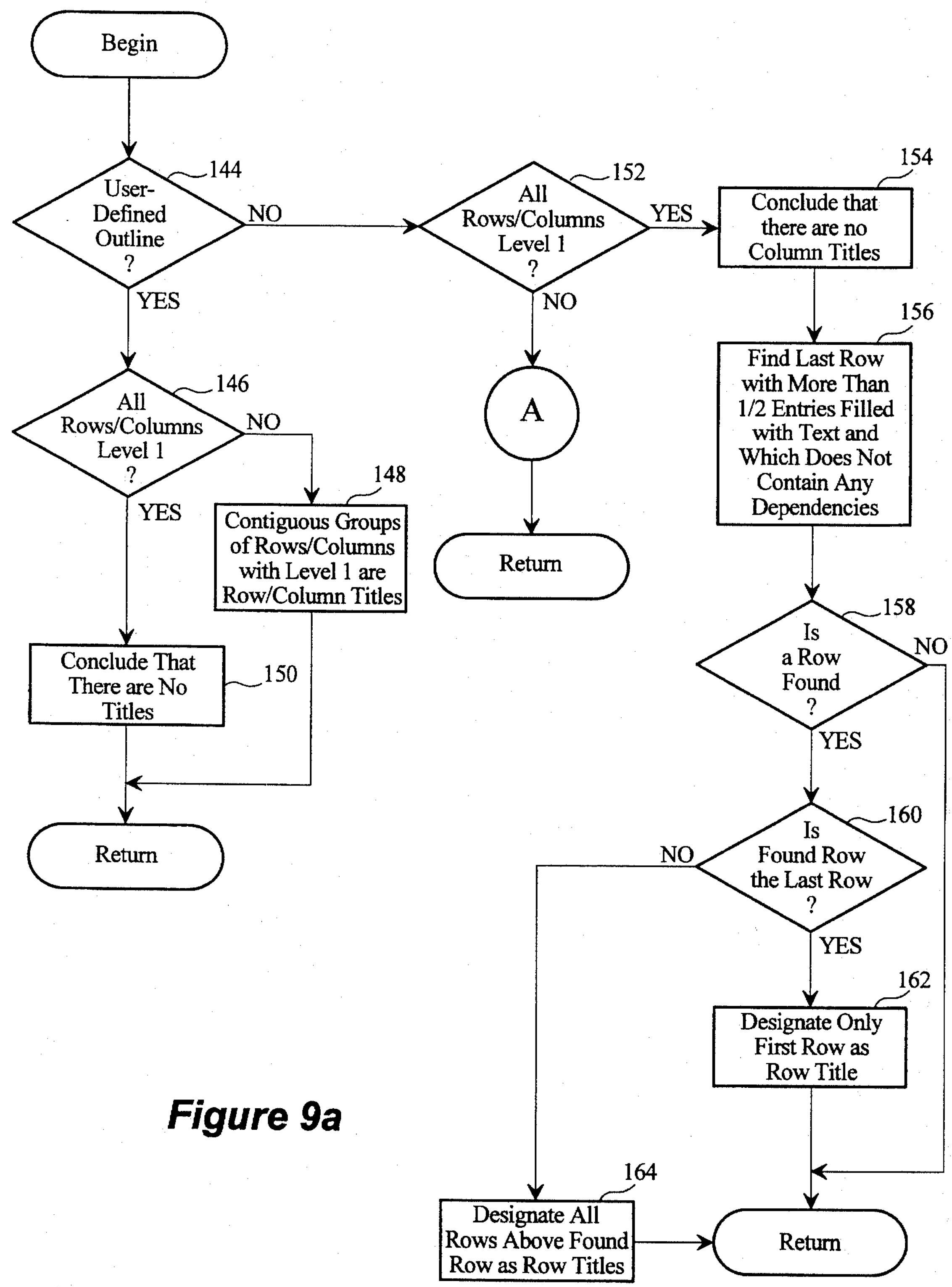
FIGS. 9*a* and 9*b* are flowcharts illustrating in more detail the step of FIG. 5*a* of finding the row/column title areas.
Figure 9B:
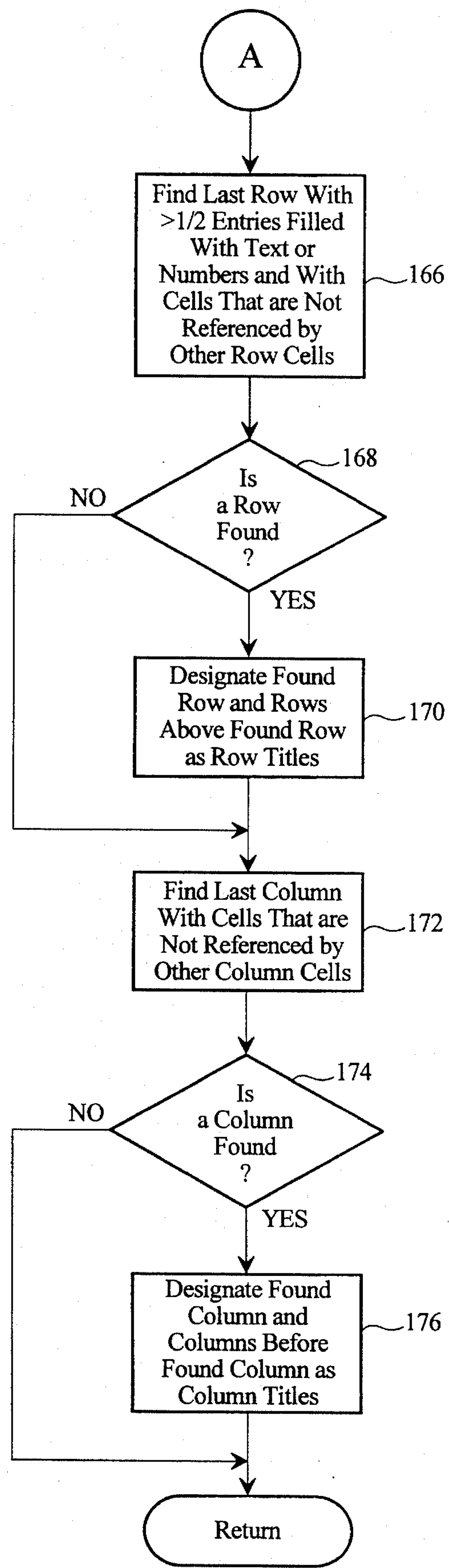

After the first guess of the table structure has been made (i.e., step 92 has been completed in FIG. 5a), the preferred embodiment described herein finds row/column title areas and row/column headers (step 94 in FIG. 5a). FIGS. 9a and 9b show a flowchart of the steps performed in finding the row/column title areas. The preferred embodiment first checks whether a user-defined outline exists (step 144 in FIG. 9a). If such a user-defined outline exists, the preferred embodiment then checks whether all rows/columns are assigned a level of level 1 (step 146). If all the rows/columns have been assigned as level 1, the preferred embodiment concludes that there are no titles (step 150). On the other hand, if all the rows/columns are not at level 1, a contiguous group of rows/columns with level 1 are row/column titles (step 148). For instance, consider the table shown in FIG. 8, row 1 is at level 1 and column A is at level 1. If the shown hierarchy is a user-created outline, row 1 and column A are designated as a row title and a column title, respectively, in step 148 of FIG. 9a.

If there is not a user-defined outline, as checked in step 144 of FIG. 9a, the preferred embodiment checks whether all rows/columns are at level 1 (step 152). In such an instance, the preferred embodiment concludes that there are no column titles (step 154). The preferred embodiment described herein then seeks to determine whether there are any row titles. The determination of whether row titles exist begins with step 156, in which the last row has more than one-half of its entries filled with text and which does not have any dependencies. If such a row is not found (see step 158), then it is concluded that there are no row titles. If such a row is found in step 158, the preferred embodiment checks whether this row is the last row in the table (step 160). If the found row is the last row in the table, only the first row of the table is designated as a row title (step 162). If the found row is not the last row, all rows above the found row are designated as row titles (step 164). Thus, steps 154, 156, 158, 160, 162 and 164 are implemented a heuristic approach to assigning the row titles when all the rows/columns are at level 1.

If at step 152 of FIG. 9a it is determined that all rows/columns are not at level 1, the steps shown in the flowchart of FIG. 9b are executed. In step 166, the spreadsheet program 22 finds the last row that has greater than one-half of its entries filled with text or numbers and that has no cells that are referenced by other row cells. If such a row is not found (see step 168), there are no row titles. In contrast, if such a row is found in step 168, the found row and the rows above the found row are designated as row titles (step 170). Similar steps are then repeated for the columns. In particular, the preferred embodiment seeks to find the last column with cells that are not referenced by other column cells (step 172). If such a column is found, the found column and the columns to the left of the found column are designated as column titles (step 176). If no such column is found, then the table does not have any column titles.

The steps shown in FIG. 9b may be illustrated by way of example. Suppose that the table of interest is the one shown in FIG. 2a. In step 166 of FIG. 9b, the preferred embodiment looks for the last row with greater than one-half entries filled with text or numbers and with cells that are not referenced by other cells. For the table shown in FIG. 2a, row 3 is the last row with greater than one-half its entries filled with text or numbers and with cells that are not referenced by other cells. Since this row was found (see step 168 in FIG. 9b), rows 1, 2 and 3 are designated as row titles (see step 170 in FIG. 9b). In step 172, the last column with cells that are not referenced by other column cells is sought. For the illustrative table of FIG. 2a, column A is the only column that meets this criteria. Thus, in step 176, column A is designated as a column title.

Figure 10:
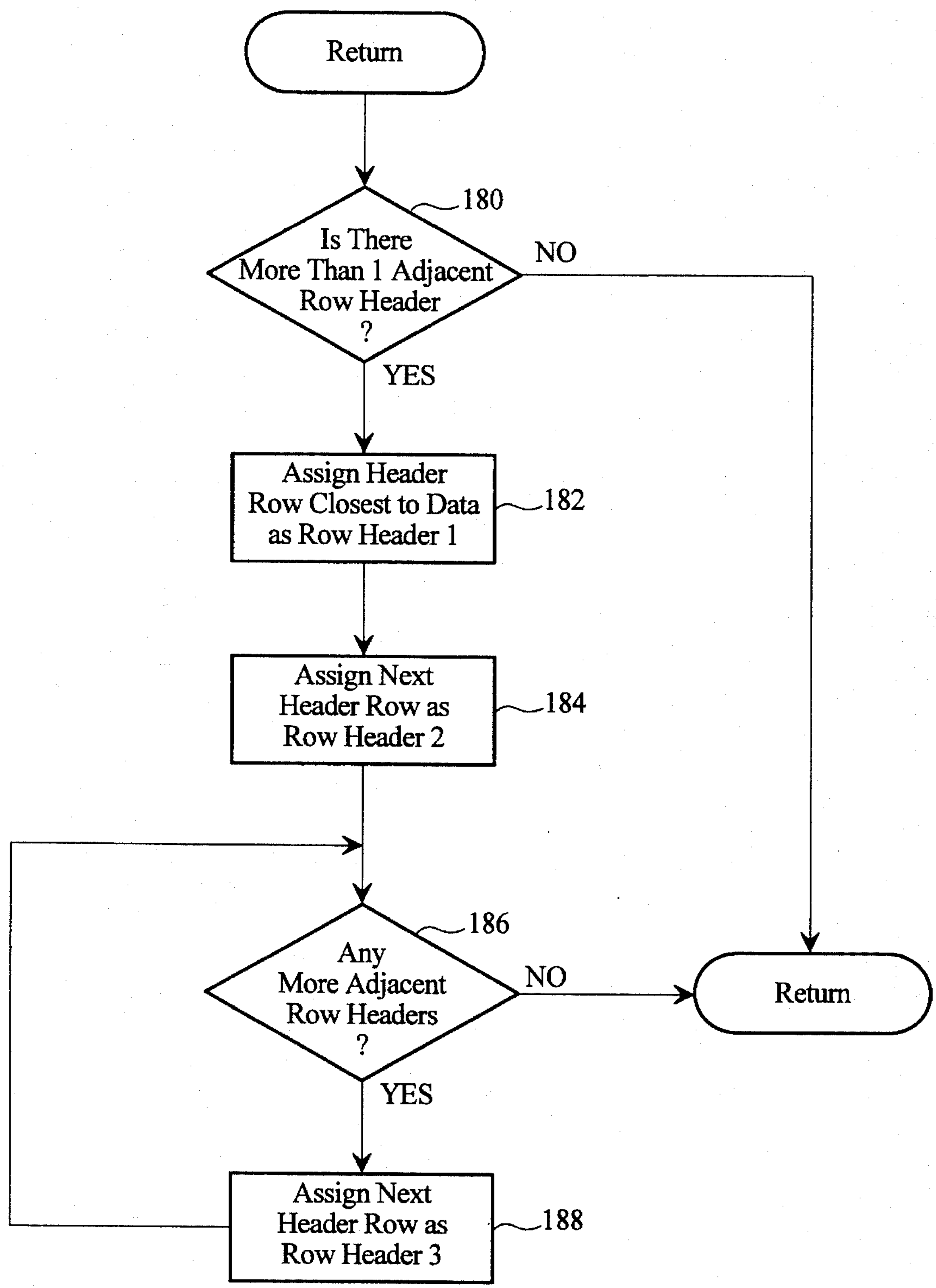
FIG. 10 is a flowchart illustrating in more detail the step of FIG. 5*a* of finding row/column headers.

The preferred embodiment described herein also seeks to find any row headers and column headers that lie outside the title areas as part of step 94 in FIG. 5a. The search for row headers and column headers occurs only when a row title area or a column title area have been found and where all of the rows/columns are not set at level 1. In such instances, all rows/columns that have no dependencies and which are non-blank are designated as row/column headers. The preferred embodiment then may apply "smoothing" to the row headers. FIG. 10 is a flowchart showing the steps performed in "smoothing." Smoothing is performed only when there is more than one adjacent row header. The smoothing is utilized to assign appropriate levels to the row headers.

In step 180, the preferred embodiment described herein determines whether there is more than one adjacent row header. If there is not more than one adjacent row header, the smoothing routine of FIG. 10 returns so that smoothing is not performed and the header is designated as a level 1 row header. On the other hand, if there is more than one adjacent row header, the header row that is closest to the data is assigned as row header 1 (step 182). The next row header is assigned as row header 2 (step 184). Any additional adjacent row headers (see step 186) are assigned as row header 3 (step 188).

With the completion of smoothing, the row/column title areas in the headers have all been found (see step 94 in FIG. 5*a*). The preferred embodiment then applies the top-left format to the intersection of the title areas (step 96). As can be seen on FIG. 2*b*, for the example table, the top-left area comprises the top-left corner of the table formed by the intersection of the column title area and the row title area. Subsequently, the rows and columns are formatted according to the formatting information stored for them in the selected predefined table formats (step 98 and step 100, respectively, in FIG. 5*a*).

Figure 11A:
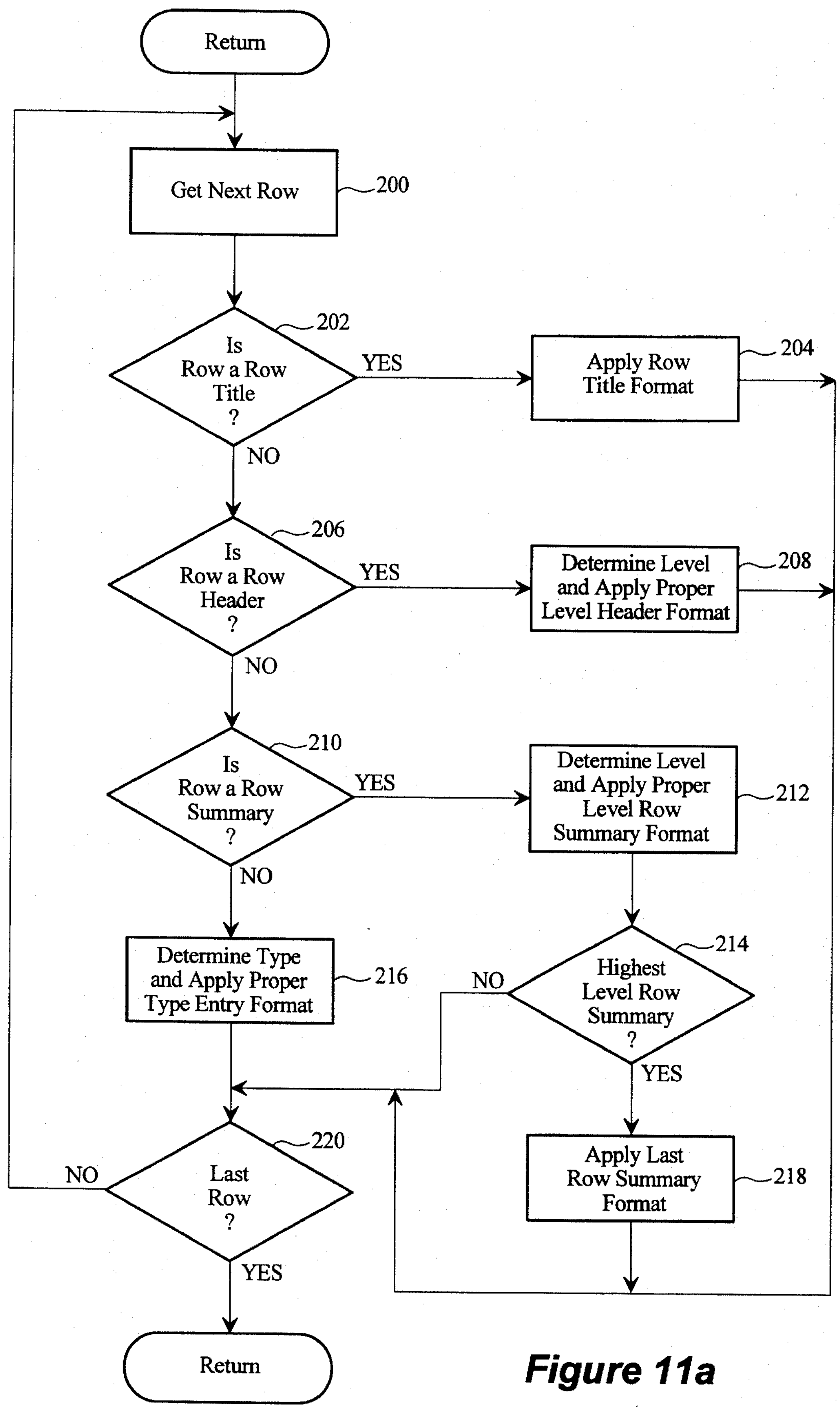
FIG. 11*a* is a flowchart illustrating in more detail the step of FIG. 5*a* of applying appropriate formats to the rows.

FIG. 11*a* depicts the steps performed by the preferred embodiment in formatting the rows (i.e., step 98 in FIG. 5*a*). In step 200 of FIG. 11*a*, the next row in the table is obtained and then a determination is made whether the row is a row title (step 202). If the row is a row title, the row title format information stored in entry 54 of the set of formatting data 26 (FIG. 3*b*) is applied (step 204 in FIG. 11*a*). If the row is not a row title, a determination is made whether the row is a row header (step 206). If the row is a row header, a determination is made as to the level of the row header and the proper level header format information is applied to the row (step 208). Specifically, the formatting information held in entries 30, 32 or 34 (FIG. 3*b*) is applied to the row. If the row is neither a row title nor a row header, a determination is made whether the row is a row summary (step 210 in FIG. 11*a*).

If the row is a row summary, the level of the row summary is determined and the proper level row summary format is applied (step 212 in FIG. 11*a*). The preferred embodiment then determines whether the row is the highest level row summary (step 214). If the row is the highest level row summary, the last row summary format (i.e., the formatting information held in entry 46 (FIG. 3*b*) of the set of formatting data 26 is applied (step 218 in FIG. 11*a*). Thus, the formatting information held in field 40 and/or field 42 (FIG. 3*b*) is applied to the row.

If the row is not a row title, a row header or a row summary, the preferred embodiment determines the row entry type (i.e., row entry1 or row entry2) of the row and applies the proper level row entry format (step 216). The formatting information for the row is held in either field 36 or field 38, as dictated by the type of the row. The above-described steps are repeated for each of the rows until the last row has been reached (step 220 in FIG. 11*a*).

Figure 11B:
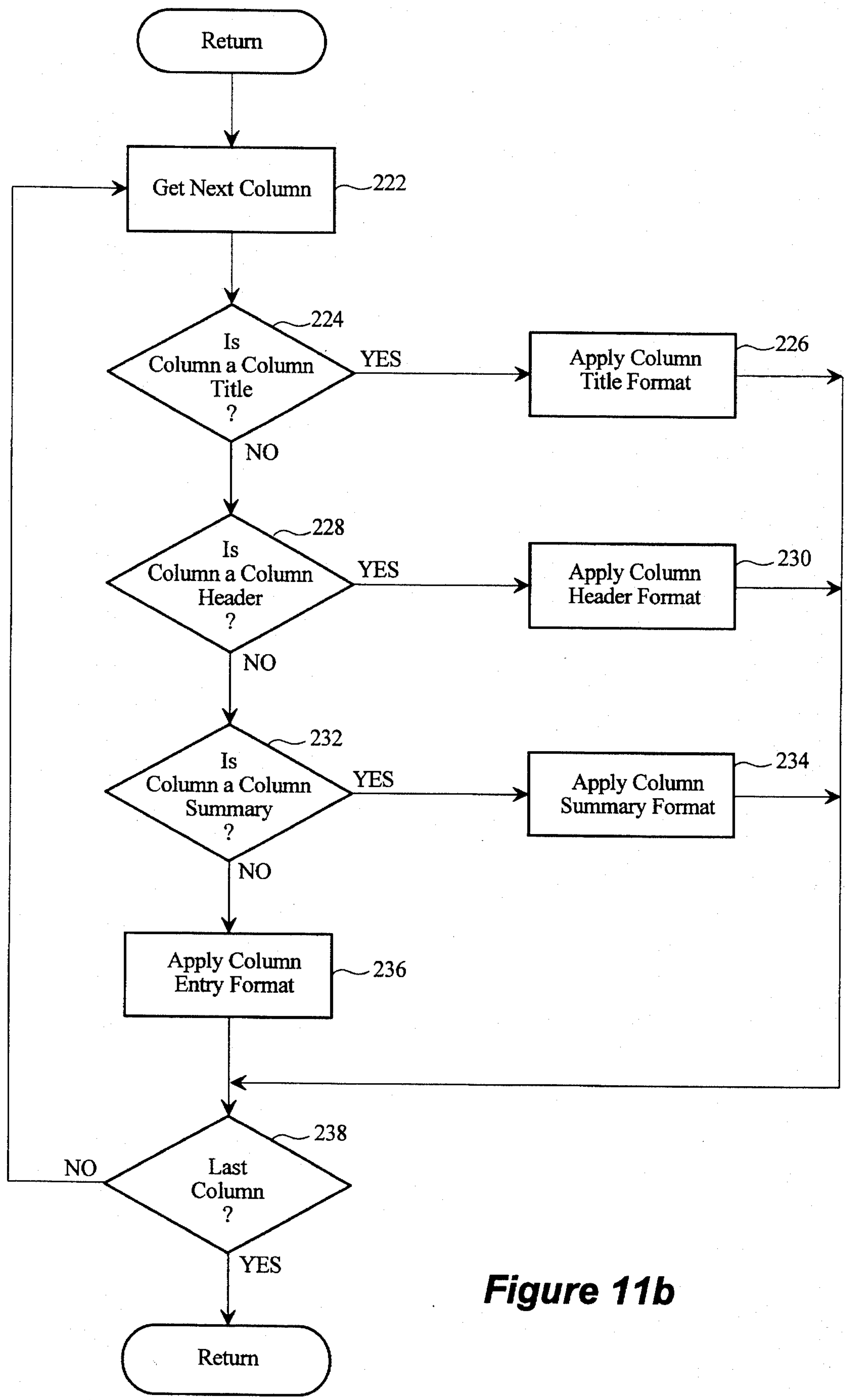
FIG. 11*b* is a flowchart illustrating in more detail the step of FIG. 5*a* of applying appropriate formats to the columns.

FIG. 11*b* sets forth the steps performed for each column of the table in performing step 100 of FIG. 5*a*. The preferred embodiment gets the next column (step 222) until the last column has been reached (step 238). For each column, a determination is made whether the column is a column title (step 224). If the column is a column title, the column title format is applied (step 226). The column title formatting information is held in field 56 of the set of formatting data 26 (see FIG. 3*b*).

If the column is not a column title, a determination is made whether the column is a column header (step 228 in FIG. 11*b*). If the column is a column header, the column header format is applied (see step 230). The formatting information for the column header is held in field 48 in the set of formatting data 26 (see FIG. 3*b*). If the column is neither a column title nor a column header, the preferred embodiment described herein checks whether the column is a column summary (step 232 in FIG. 11*b*). When the column is a column summary, the column summary format is applied (step 234). The column summary formatting information is held in field 52 of the set of formatting data 26 (see FIG. 3*b*).

If the column is not a column title, a column header or a column summary, the column is necessarily a conventional column entry. As such, the column is formatted according to the format information held in field 50 of the set of formatting data 26 (FIG. 3*b*).

After the completion of step 100 in FIG. 5*a*, the steps shown in FIG. 5*b* are performed. In particular, a whole table border is reapplied (step 102). Next, a determination is made whether there is a title in the top-left cell (step 104). If there is a title in the top-left cell and a bit field value in the bit field 78 (FIG. 3*c*) indicates the title is to be centered (step 105), the cell is centered across the columns of the table (step 106). A best fit of column widths for the header columns is then determined and applied (step 108). If there are a number of column headers at the same level (i.e., siblings), the largest best fit column width is applied to all the columns. The best fit is applied to the rightmost column title. Lastly, the row heights are increased by a fraction of the row headers (step 110). For the example table shown in FIG. 2*a*, a resulting illustrative table format is shown in FIG. 2*b*.

The sequence with which the formatting information is applied to the table parts is selected to realize the desired predefined table format. Other sequences are possible, but certain other sequences may cause undesired formatting changes. The undesired formatting changes are due to the overlap of table parts, which causes formatting one table part to result in a change in format for a portion of another table part (e.g., a cell that is shared between the table parts). The heuristics for determining table structure are designed to work on tables of different sizes. The heuristics are scalable so that they work on a table like that shown in FIG. 2*a* equally well as a table like that shown in FIG. 8.

Figure 12:
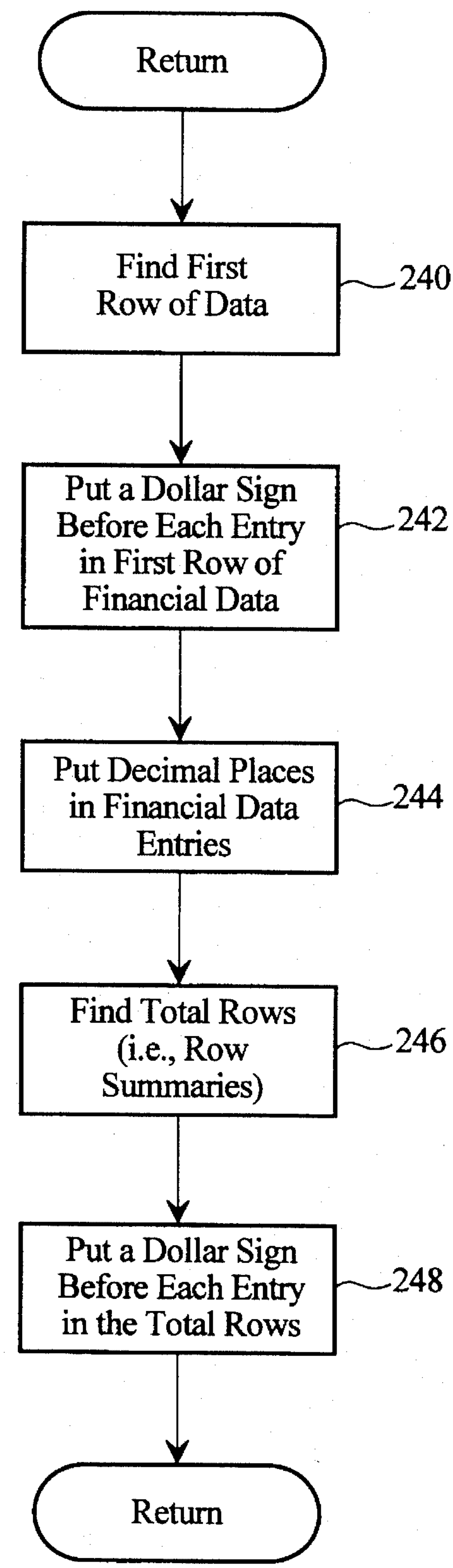
FIG. 12 is a flowchart illustrating the steps performed when the predefined table format selected in the preferred embodiment of the present invention is a financial table format.

The predefined table formats provided by the preferred embodiment of the present invention include financial table formats. Financial table formats perform the steps shown in the flowchart of FIG. 12. In particular, a first row of data in the table is found (step 240), and a dollar sign is placed before each entry in the first row of data if the row contains financial data (step 242). Decimal places for separating dollars from cents are added to all of the financial data entries in the table (step 244). The total rows are found (step 246), and a dallor sign is inserted before each entry in the total rows (step 248). If the rows contain information other than financial data, such as percentages, the dallor signs and the decimal places are not added. As with other tables, the highest level row summary is also formatted according to the information contained in the row summary last entry 46 shown in FIG. 3*b* (see step 218 in FIG. 11*a*). As a result of the steps, the table assumes a format that is more consistent with conventional financial tables.

While the present invention has been described with reference to a preferred embodiment thereof, those skilled in the art will appreciate that various changes in form and scope may be made without departing from the spirit of the present invention as defined in the appended claims.

We claim:

1. In a data processing system having a processor that runs a spreadsheet program, a method of identifying a table to be formatted in a spreadsheet composed of cells that may be empty or hold contents, said method comprising the computer-implemented steps of:

designating a cell as an active cell;

identifying the active cell as part of the table to be formatted;

iteratively identifying each cell that is immediately adjacent in a vertical direction to a cell that has already been identified as part of the table and that holds non-empty contents as part of the table to be formatted, such that said identifying identifies a selected column of cells composed of a number of cells that are part of the table to be formatted; and iteratively identifying each column of cells, that has a number of cells equal to the selected column of cells and that is immediately adjacent to a column of cells that already has been identified as part of the table to be formatted and that includes at least one cell that holds non-empty contents, as part of the table to be formatted.

2. The method of claim 1 wherein the cells that have been identified to be part of the table include rows having a given number of cells, including a topmost row and a bottommost row and wherein the method further comprises the step of iteratively identifying each row of cells in the spreadsheet having the given number of cells that is immediately adjacent to the topmost row or the bottomost row and that has at least one cell that holds non-empty contents as part of the table to be formatted.

3. The method of claim 1, further comprising the step of formatting the table.

4. The method of claim 1 wherein the data processing system is a distributed system.

* * * * *